June 22, 1965    J. A. BLYTHE, JR    3,190,257
SAILING INDICATOR FOR STARTING LINE, COURSE AND WIND DIRECTION
Filed Nov. 4, 1963    2 Sheets-Sheet 1
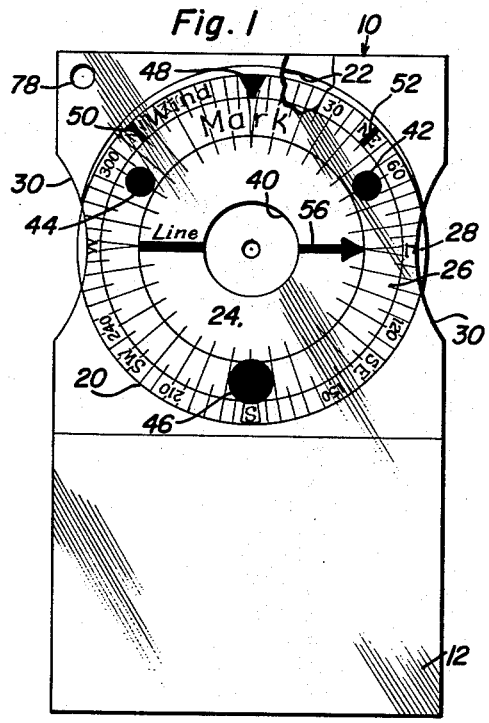
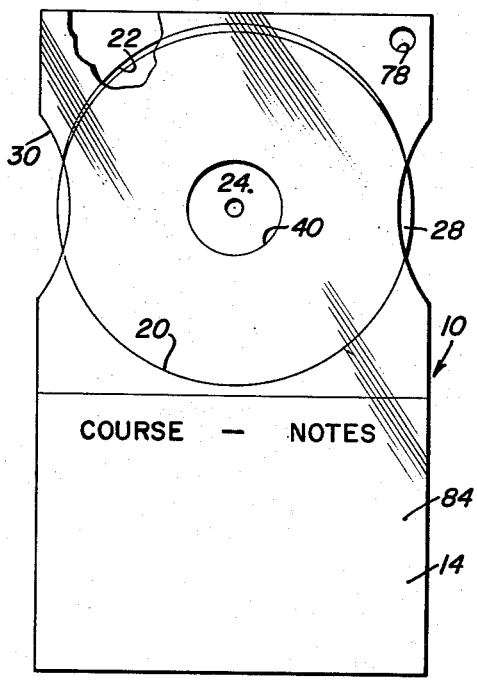
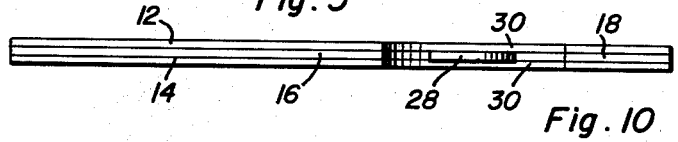
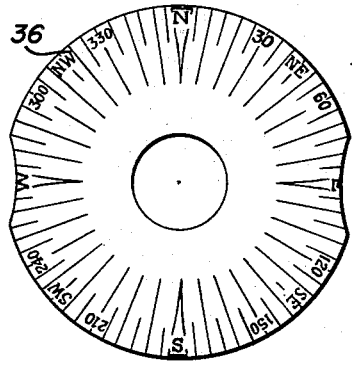
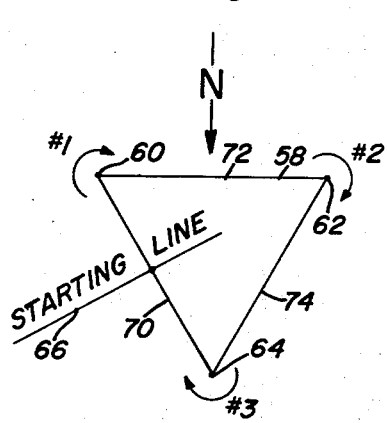
Joseph A. Blythe, Jr.
INVENTOR.

June 22, 1965  J. A. BLYTHE, JR  3,190,257
SAILING INDICATOR FOR STARTING LINE, COURSE AND WIND DIRECTION
Filed Nov. 4, 1963  2 Sheets-Sheet 2
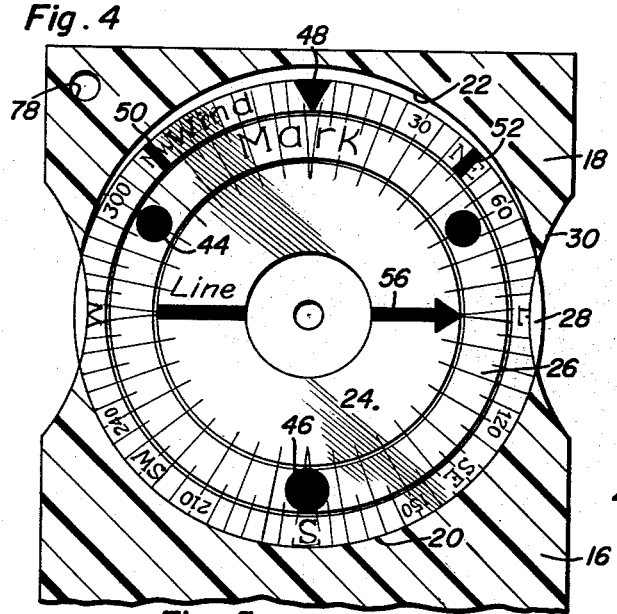
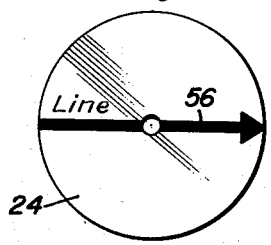
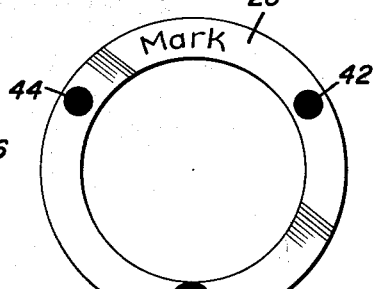
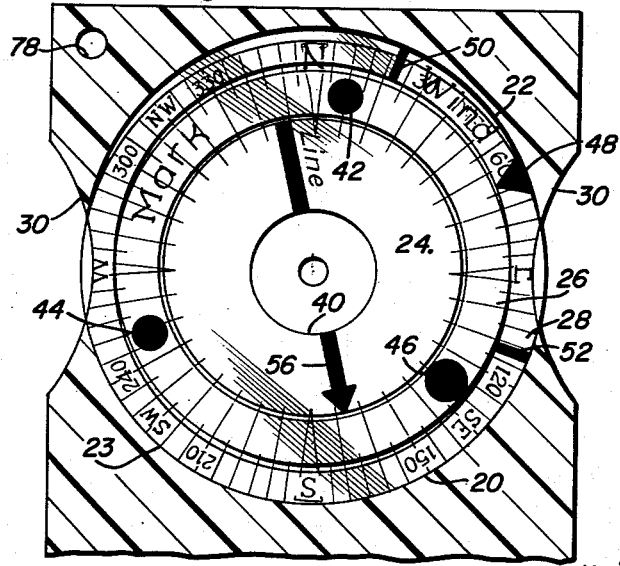
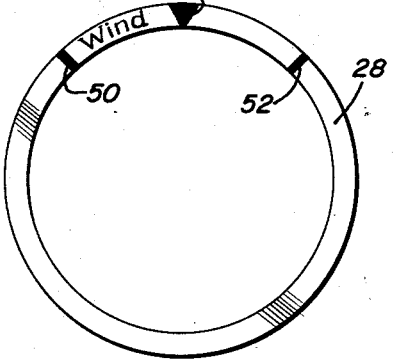
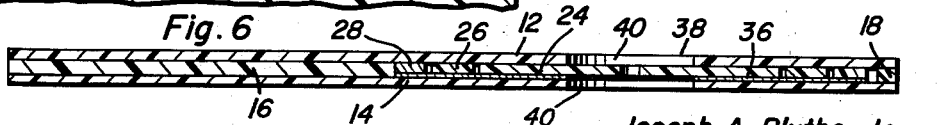
Joseph A. Blythe, Jr.
INVENTOR.

United States Patent Office 3,190,257
Patented June 22, 1965

3,190,257
SAILING INDICATOR FOR STARTING LINE, COURSE AND WIND DIRECTION
Joseph A. Blythe, Jr., P.O. Box 1985, Jackson, Miss.
Filed Nov. 4, 1963, Ser. No. 321,172
8 Claims. (Cl. 116—133)

This invention relates to a novel and useful indicator designed specifically to provide a means whereby the starting line and wind direction may be indicated in adjacent relationship to the outline of a sailing race course which is properly oriented relative to the points of a compass.

The sailing indicator of the instant invention includes three concentric disks formed of transparent material and disposed in overlying relation to a compass rose. The three individual disks have the plan outline of the race course, the starting line for the race course, and the wind direction indicated thereon by means of indicia which may be properly orientated relative to the compass rose and to each other in a manner that will enable the captain of a sailboat to select the most advantageous course.

The main object of this invention is to provide an indicator which may be utilized in such a manner that the orientation of the race course relative to the points of the compass, the starting line and the wind direction relative to the race course may be accurately visualized on a small scale, these factors normally having to be plotted on a chart or mentally juggled. If these factors are mentally juggled, there is of course an ever present possibility that a mistake in mental computations will result in an adverse decision during a race. Further, in smaller sailboats there is usually insufficient space or inadequate working conditions to allow the race course, starting line and wind direction to be plotted on a chart. Further, as the wind direction represents a variable, valuable time must be lost in replotting the race as the wind direction changes.

It is a further object of this invention to provide a sailing indicator in accordance with the preceding object which may be termed pocket size and including an area thereon upon which temporary notes may be made in pencil, the specially prepared area being such that pencilled notes thereon may be readily erased when no longer needed.

Yet another object of this invention is to provide a sailing indicator constructed in a manner whereby repeated handling of the indicator will not disrupt the settings of the various movable portions of the indicator.

Still another object of this invention is to provide an indicator which will enable a captain, after having estimated the approximate wind drift, to accurately set the indicator so as to render a corrected heading as opposed to a true course.

Another object of this invention is to provide an indicator which may be utilized by the captain of a sailboat as a means for determining whether or not he can fetch the mark to round it on a single tack.

A still further object of this invention is to provide an indicator which may be readily manipulated with one hand while holding the indicator i n that same hand thereby affording one-handed operation.

A final object of this invention to be specifically enumerated herein is to provide an indicator in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the indicator of the instant invention;

FIGURE 2 is a bottom plan view of the indicator;

FIGURE 3 is a side elevational view of the indicator;

FIGURES 4 and 5 are fragmentary horizonal sectional views on somewhat of an enlarged scale taken substantially upon planes passing through the filler portions of the indicator disposed between the top and bottom panels thereof and with the various disks of the indicators shown in elevation;

FIGURE 6 is an enlarged longitudinal vertical sectional view taken substantially upon a plane passing through the longitudinal centerline of the indicator;

FIGURES 7, 8 and 9 are top plan views of the three movable disks of the indicator;

FIGURE 10 is a top plan view of the compass rose which is secured to the upper surface of the lower outer panel member; and FIGURE 11 is a diagrammatical view of a typical equilateral triangular sailing course with the wind direction and starting line shown in proper orientation relative thereto.

Referring now more specifically to the drawings, the numeral 10 generally designates the pocket size sailing indicator of the instant invention. The indicator 10 includes top and bottom panel members 12 and 14 which sandwich therebetween a pair of filler members 16 and 18. The filler members 16 and 18 include generally semi-cylindrical opposing surfaces 20 and 22 which define a shallow generally cylindrical recess 23 extending between the panel members 12 and 14 and in which three disks including a center disk 24, an inner apertured disc or ring 26 and an outer ring 28 are disposed therein.

The disk 24 and the inner and outer rings 26 and 28 are disposed in concentric relation and are snugly received in the recess 23. In addition, it may be seen from FIGURES 4 and 5 of the drawings that opposite side portions of the panel members 12 and 14 are provided with finger-receiving recesses 30. Diametrically opposite portions of the recess 23 open outwardly of the recesses 30 and the outer peripheral portion of diametrically opposite sections of the outer ring 28 are exposed for manipulation by the fingers of the user.

The generally semi-cylindrical surface 22 is slightly radially enlarged at its midportion whereby the opposite end portions of the surface 22 frictionally engage the outer peripheral edge portions of the outer ring 28. The space between the center of the arcuate surface 22 and the outer ring 28 defines an expansion zone into which the outer ring 28 may be diametrically expanded along a diameter disposed substantially at right angles to a line interconnecting the recesses 30.

It is to be noted that at least the portion of the panel member 12 in registry with the recess 23 is to be constructed of transparent material and that the disk 24 and rings 26 and 28 are also to be constructed of transparent material. A compass rose 36 is secured to the upper surface of the bottom or lower panel member 14 within the recess 23 and the disk 24 and the rings 26 and 28 overlie the compass rose and are registrable with the various markings thereon. Further, it will be noted that the outer ring 28 has a smaller radial extent than the inner ring 26 and inasmuch as the disk 24 and the rings 26 and 28 are to be constructed of a transparent material such as a semi-rigid plastic having resilient properties, the outer ring 28 may be diametrically compressed by radially inward finger pressure applied to the portions of the outer ring 28 projecting outwardly of the recesses 30. In this manner, the inner peripheral edges of the outer ring 28 may be frictionally engaged with the outer peripheral surfaces of the inner ring 26 and the otherwise inaccessible inner ring 26 may be rotated relative to the compass rose 36.

The panel members 12 and 14 are provided with alined finger openings 38 and 40 respectively whereby the opposite sides of the disk 24 may be gripped between two fingers so as to effect rotation of the disk 24 relative to the compass rose.

It is to be understood that the confronting surfaces of the panel members 12 and 14 registered with the recess 23 are disposed in frictional engagement with the opposite side surfaces of the disk 24 and rings 26 and 28 and thereby frictionally retain the disk 24 and rings 26 and 28 in adjusted rotated positions. In addition, inasmuch as portions of the outer peripheral edges of the outer ring 28 are exposed, additional means for frictionally retaining the outer ring 28 in adjusted rotated positions is provided in the form of the opposite end portions of the generally semi-cylindrical surface 22. Accordingly, it may be seen that while all of the disk 24 and rings 26 and 28 may be adjustably positioned relative to each other and to the compass rose 36 the sailing indicator includes means by which the disk 24 and rings 26 and 28 are frictionally retained in adjusted positions against accidental rotation relative to each other and to the compass rose 36.

In operation, the ring 26 which has three dots 42, 44 and 46 formed thereon is utilized to designate the positions of three buoys of an equilateral triangular race course. The indicator 10 is initially set by diametrically compressing the outer ring 28 in the manner hereinbefore set forth in order to rotate the inner ring 26 relative to the compass rose 36. Then, the outer ring 28 may be rotated to indicate the direction from which the wind is blowing, which direction is designated by the arrow 48. Further, it will be noted that the outer ring 28 also includes a pair of marks 50 and 52 which lie on radii disposed at 45° relative to the radii upon which the arrow 48 is disposed. These marks 50 and 52 define courses therebetween which can normally not be made by a boat under sail power alone inasmuch as any course lying between these two marks would comprise a course with too little angular deviation relative to a direction extending directly into the wind.

After the outer ring 28 has been set, the disk 24 may be rotated to designate the position of the starting line 56 in relation to one leg of the race course. With attention now directed to FIGURE 11 of the drawings there may be seen a diagrammatical showing of an equilateral triangular race course 58. Buoy No. 1 and designated by the reference numeral 60 corresponds to the mark or dot 46 on the inner ring 26, buoy No. 2 referred to by the reference numeral 62 corresponds to the dot 44 on the inner ring 26, and buoy No. 3 and designated by the reference numeral 64 corresponds to the dot 42 on the inner ring 26. The starting line 66 is represented on the indicator 10 by means of the starting line 56 on the disk 24. The position of the starting line 66 may be utilized to provide an accurate determination of its actual location on the race course and therefore may be utilized by an experienced captain to enable him to move his boat across the starting line as soon after the starting gun is fired as possible. After the race has begun, the starting line 56 on the disk 24 may be positioned so as to generally parallel the true course line 70 extending between buoys Nos. 1 and 3. Upon setting the disk 24 in such a position, the captain of the sailboat will immediately be able to determine that the true course line 70 lies between the marks 50 and 52 thereby indicating to the captain that a 310° course corresponding to the mark 50 will have to be followed until such time as he has passed somewhat beyond the true course line 72 extending between the No. 1 and No. 2 buoys. However, before rounding No. 1 buoy the captain may rotate the disk 24 so that the starting line 56 will parallel the true course line 72. Then, after making a mental computation as to the wind drift which will be prevailing during the reach leg from the No. 1 buoy to the No. 2 buoy, the captain may rotate the disk 24 in a counterclockwise direction a predetermined number of degrees so as to give an approximation of the proper corrected course he must follow from the No. 1 buoy to the No. 2 buoy. Then, the captain may again make a mental computation as to his position relative to the race course No. 72 at the time he believes he should make his initial tack to round the No. 1 buoy. It may be that the captain would want to round the No. 1 buoy on two successive courses. However, after rounding the No. 1 buoy and proceeding to the No. 2 buoy on the predetermined corrected course, the captain may then round the No. 2 buoy and rotate the disk 24 so that the starting line 56 will generally parallel the true course line 74 extending between the No. 2 and No. 3 buoys. Then, after estimating the approximate southerly drift which will prevail during his reach leg to the No. 3 buoy, the captain may rotate the disk 24 in a clockwise direction a predetermined number of degrees so as to approximate a corrected course which will bring his sailboat to the No. 3 buoy just on the outside thereof. Finally, after rounding the No. 3 buoy, the captain may again take his initial course for crossing the starting line 66 which will then be the finish line. However, should the direction of the wind shift during the race, the outer ring 28 may be readily adjusted so as to indicate the new wind direction and subsequent course computations will then be made taking into consideration the new wind direction.

Inasmuch as the sailing indicator 10 is substantially panel-like in configuration and includes only two small portions of the outer ring 28 which are exposed and two small portions of the disk 24 which are exposed, there is very little likelihood that the various disks would be accidentally shifted in position relative to the compass rose 36. Further, one corner of the indicator 10 is suitably apertured as at 78 whereby the indicator 10 may be supported about the neck of the captain on a suitable necklace or string. In this manner, the indicator 10 will be readily available for instant computation and referral.

Further, the underside of the bottom panel 14 is provided with a roughened area 84 upon which pencilled notes may be made. This roughened area 84 is such that the pencilled notes may be readily erased therefrom when the notes are no longer desired. Still further, the marks 50 and 52 may be utilized by the captain during the race and when close hauled on a beat leg as lines of sight to determine if his boat is disposed forward of or to the rear of a line extending at 90° relative to the wind direction upon which a competitive boat lies. In this manner, the captain may ascertain whether he will be in front of or to the rear of such a boat after tacking on the same beat leg of the course.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An indicating device for selectively registering several sets of indicia with each other comprising a pair of spaced panel members, spaced filler means disposed between said panel members and defining a shallow generally cylindrical recess extending between said panel members, a center disk and inner and outer concentric rings disposed about said disk and in said recess, one of said panel members including at least one transparent portion disposed in registry with said recess, first indicia on the other panel member visible from said recess and second, third, and fourth indicia on said disk and outer and inner rings respectively registrable with each other and said first indicia, diametrically opposite portions of said recess opening outwardly of the corresponding marginal edge portions of said panel members whereby diametrically opposite portions of the outer ring only are exposed for finger manipulation, at least one of said panel members having an opening therein through which access to said disk may be had for effecting rotation of the latter in said recess, the opposing sides of said panel members being disposed in frictional sliding contacting relation with the opposite sides of said disk, said outer ring being slightly diametrically compressible whereby its inner periphery may be frictionally engaged with the outer periphery of the inner ring to rotate the otherwise inaccessible inner ring relative to said panel members.

2. An indicating device for selectively registering several sets of indicia with each other comprising a pair of spaced panel members, spaced filler means disposed between said panel members and defining a shallow generally cylindrical recess extending between said panel members, an inner ring and an outer ring disposed concentrically in said recess, one of said panel members including at least one transparent portion disposed in registry with said recess, first indicia on the other panel member visible from said recess and second and third indicia on said inner and outer rings respectively, registrable with each other and said first indicia, diametrically opposite portions of said recess opening outwardly of the corresponding marginal edge portions of said panel member whereby diametrically opposite portions of the outer ring only are exposed for finger manipulation, the opposing sides of said panel members being disposed in frictional sliding contacting relation with the opposite sides of said ring, said outer ring being slightly diametrically compressible whereby its inner periphery may be frictionally engaged with the outer periphery of the inner ring to rotate the otherwise inaccessible inner ring relative to said panel members.

3. The combination of claim 2 wherein said recess is slightly radially enlarged in at least one area lying on radii of said recess extending transversely of a line extending between the exposed portions of said outer ring.

4. An indicating device for selectively registering several sets of indicia with each other comprising a pair of spaced panel members, spaced filler means disposed between said panel members and defining a shallow generally cylindrical recess extending between said panel members, inner and outer rings disposed concentrically in said recess, one of said panel members and said inner ring including indicia registrable with each other, diametrically opposite portions of said recess opening outwardly of the corresponding marginal edge portions of said panel member whereby diametrically opposite portions of the outer ring only are exposed for finger manipulation, the opposing sides of said panel members being disposed in frictional sliding contacting relation with the opposite sides of said inner ring, said outer ring being slightly diametrically compressible whereby its inner periphery may be frictionally engaged with the outer periphery of the inner ring to rotate the otherwise inaccessible inner disk relative to said panel members.

5. The combination of claim 4 wherein said recess is slightly radially enlarged in at least one area lying on radii of said recess extending transversely of a line extending between the exposed portions of said outer disk.

6. The combination of claim 4 wherein said outer ring has a less radial thickness than said inner ring.

7. The combination of claim 4 wherein said filler means define a pair of opposing generally semi-cylindrical surfaces, one of said surfaces having opposite end portions disposed in sliding frictional engagement with the outer peripheral edge of said outer ring and a mid-portion spaced from said peripheral edge thereby enabling diametric elongation of said outer disk along a line extending transversely of a line extending between the exposed portions of said outer ring.

8. The combination of claim 1 wherein the indicia on said one panel member comprises a compass rose, the indicia on said inner ring defines the plan outline of a sailing race course, and the indicia on said center disk and said outer ring comprise the wind heading and a diametric line respectively.

References Cited by the Examiner
UNITED STATES PATENTS

| | | | |
|---|---|---|---|
| 2,537,693 | 1/51 | Mono | 40—113 |
| 2,775,404 | 12/56 | Lahr | 235—61.02 |
| 2,842,877 | 7/58 | Stevens | 40—70 |
| 2,912,776 | 11/59 | Koerber | 116—133 |
| 2,932,104 | 4/60 | Corbett | 40—70 |
| 3,084,858 | 4/63 | Clapp | 235—84 |

LOUIS J. CAPOZI, *Primary Examiner.*